(12) United States Patent
Calman et al.

(10) Patent No.: US 8,866,878 B2
(45) Date of Patent: Oct. 21, 2014

(54) REPRESENTATIVE PRE-SELECTION FOR CUSTOMER SERVICE VIDEO CONFERENCE

(71) Applicant: Bank of America Corporation, Charlotte, NC (US)

(72) Inventors: Matthew A. Calman, Charlotte, NC (US); Alicia C. Jones, Fort Mill, SC (US); Elizabeth S. Votaw, Potomac, MD (US); Rajat Agrawal, Sunnyvale, CA (US); Wanwen Han, Jersey City, NJ (US); Su Liu, Pittsburgh, PA (US); Nir Rachmel, Brookline, MA (US); Lynn Streja, Pittsburgh, PA (US); Carrie Anne Hanson, Charlotte, NC (US); Cameron Jungeun Park-Hur, Castro Valley, CA (US); James Robert Grimsley, Dover, FL (US)

(73) Assignee: Bank of America Corporation, Charlotte, NC (US)

( * ) Notice: Subject to any disclaimer, the term of this patent is extended or adjusted under 35 U.S.C. 154(b) by 107 days.

(21) Appl. No.: 13/652,175

(22) Filed: Oct. 15, 2012

(65) Prior Publication Data
US 2014/0104371 A1    Apr. 17, 2014

(51) Int. Cl.
    *H04N 7/14*    (2006.01)
(52) U.S. Cl.
    CPC ...................................... *H04N 7/14* (2013.01)
    USPC .................. 348/14.08; 348/14.01; 348/14.09; 379/265.09; 379/265.11

(58) Field of Classification Search
    CPC .......... H04N 7/14; H04N 7/141; H04N 7/142; H04N 7/143; H04N 7/147; H04N 7/148; H04N 7/15; H04M 3/42
    USPC .......... 348/14.01–14.16; 379/265.09, 265.11, 379/265.12, 266.01; 705/42, 43
    See application file for complete search history.

(56) References Cited

U.S. PATENT DOCUMENTS

| 5,604,341 | A | * | 2/1997 | Grossi et al. ................... 235/379 |
| 2011/0261947 | A1 | * | 10/2011 | Benefield et al. ......... 379/265.09 |
| 2012/0170728 | A1 | * | 7/2012 | Wengrovitz et al. ....... 379/93.21 |

* cited by examiner

*Primary Examiner* — Melur Ramakrishnaiah
(74) *Attorney, Agent, or Firm* — Moore and Van Allen, PLLC; Michael A. Springs; Patrick B. Horne

(57) ABSTRACT

Embodiments of the invention are directed to systems, methods and computer program products for assisting a user to select a customer service representative of a financial institution in preparation for a customer service conference. Embodiments determine that an operative connection is being established between a user device of the user and a system associated with the financial institution, such that the user and the representative of the financial institution may conduct the conference; recognize the user as a customer enrolled in a representative pre-selection program; determine at least one representative from a pool of potential representatives, the at least one representative determined for presentation to the user for user selection and determined based at least in part on the user having previously conferenced with the at least one representative; and receive user input selecting one of the at least one representatives for conference connection.

21 Claims, 10 Drawing Sheets

US 8,866,878 B2

REPRESENTATIVE PRE-SELECTION FOR CUSTOMER SERVICE VIDEO CONFERENCE

BACKGROUND

In some circumstances, a customer may desire to speak with or ask a question of a representative of a financial institution. Currently, the customer must go to a banking facility, speak with the representative over the phone, or chat with the representative via text based communications. All of these methods have limitations including inconvenience and lack of ability to select representatives for interaction. Thus, there is a need for a system providing an interactive conference.

BRIEF SUMMARY

Embodiments of the invention are directed to systems, methods and computer program products for assisting a user to select a customer service representative of a financial institution in preparation for a customer service conference.

According to some embodiments of the invention, an apparatus includes a memory; a processor; and a computing module stored in the memory, executable by the processor, and to cause the processor to: determine that an operative connection is being established between a user device of the user and a system associated with the financial institution, such that the user and the representative of the financial institution may conduct the conference; recognize the user as a customer enrolled in a representative pre-selection program; determine at least one representative from a pool of potential representatives, the at least one representative determined for presentation to the user for user selection and determined based at least in part on the user having previously conferenced with the at least one representative; and receive user input selecting one of the at least one representatives for conference connection.

In some embodiments, the pool of potential representatives comprise at least one representative assigned to the user, the at least one representative assigned to the user being a loan officer, financial planner, or personal banker.

In some embodiments, the computing module is further to cause the processor to: determine at least two representatives from a pool of potential representatives, wherein the user has previously conferenced with each of the at least two representatives; determine a ranking of the at least two representatives based at least in part on feedback received from the user; and initiate presentation of the at least two representatives in an order corresponding to the ranking or presentation of the ranking.

In some embodiments, the computing module is further to cause the processor to: initiate presentation of the at least one representative to the user for user selection, the presentation comprising: initiating presentation of an image of the at least one representative; and initiating presentation of information associated with the at least one representative, the information comprising the representative's name, at least one personal interest of the representative, education information, and experience information.

In some embodiments, the computing module is further to cause the processor to: in response to receiving the user input selecting one of the representatives for connection, determine that the selected one of the representatives is unavailable for conference connection; determine a second one of the representatives for conferencing with the user based at least in part on a recommendation from the selected one of the representatives; and establish an operative connection between the user device and a representative system associated with the second representative over which the user and the second representative can conduct an audio-visual conference.

In some embodiments, the computing module is further to cause the processor to: receive user preference information indicating the user's preference for at least one characteristic associated with a desired representative; in response to receiving the user input selecting one of the representatives for connection, determine that the selected one of the representatives is unavailable for conference connection; determine a second one of the representatives for conferencing with the user based at least in part on at least one characteristic being associated with the second one of the representatives; and establish an operative connection between the user device and a representative system associated with the second representative over which the user and the second representative can conduct an audio-visual conference.

In some embodiments, the computer program code is further to cause the processor to: in response to receiving the user input selecting one of the representatives for connection, establishing an operative connection between the user device and a representative system associated with the representative over which the user and the representative can conduct an audio-visual conference; determine that a second representative is needed for the conference; determine at least one second representative from a second pool of potential representatives, the at least one second representative determined for presentation to the user for user selection and determined based at least in part on the user having previously conferenced with the at least one second representative; receive user input selecting one of the at least one second representatives for conference connection; and establish an operative connection among the user device, a representative system associated with the representative, and a second representative system associated with the second representative over which the user, the representative and the second representative can conduct an audio-visual conference.

According to some embodiments of the invention, a method includes providing a processor for executing computer program code stored in a non-transitory computer-readable medium to cause the processor to: determine that an operative connection is being established between a user device of the user and a system associated with the financial institution, such that the user and the representative of the financial institution may conduct the conference; recognize the user as a customer enrolled in a representative pre-selection program; determine at least one representative from a pool of potential representatives, the at least one representative determined for presentation to the user for user selection and determined based at least in part on the user having previously conferenced with the at least one representative; and receive user input selecting one of the at least one representatives for conference connection.

In some embodiments, the pool of potential representatives comprise at least one representative assigned to the user, the at least one representative assigned to the user being a loan officer, financial planner, or personal banker.

In some embodiments, the computing module is further to cause the processor to: determine at least two representatives from a pool of potential representatives, wherein the user has previously conferenced with each of the at least two representatives; determine a ranking of the at least two representatives based at least in part on feedback received from the user; and initiate presentation of the at least two representatives in an order corresponding to the ranking or presentation of the ranking.

In some embodiments, the computing module is further to cause the processor to: initiate presentation of the at least one representative to the user for user selection, the presentation comprising: initiating presentation of an image of the at least one representative; and initiating presentation of information associated with the at least one representative, the information comprising the representative's name, at least one personal interest of the representative, education information, and experience information.

In some embodiments, the computing module is further to cause the processor to: in response to receiving the user input selecting one of the representatives for connection, determine that the selected one of the representatives is unavailable for conference connection; determine a second one of the representatives for conferencing with the user based at least in part on a recommendation from the selected one of the representatives; and establish an operative connection between the user device and a representative system associated with the second representative over which the user and the second representative can conduct an audio-visual conference.

In some embodiments, the computing module is further to cause the processor to: receive user preference information indicating the user's preference for at least one characteristic associated with a desired representative; in response to receiving the user input selecting one of the representatives for connection, determine that the selected one of the representatives is unavailable for conference connection; determine a second one of the representatives for conferencing with the user based at least in part on at least one characteristic being associated with the second one of the representatives; and establish an operative connection between the user device and a representative system associated with the second representative over which the user and the second representative can conduct an audio-visual conference.

In some embodiments, the computer program code is further to cause the processor to: in response to receiving the user input selecting one of the representatives for connection, establishing an operative connection between the user device and a representative system associated with the representative over which the user and the representative can conduct an audio-visual conference; determine that a second representative is needed for the conference; determine at least one second representative from a second pool of potential representatives, the at least one second representative determined for presentation to the user for user selection and determined based at least in part on the user having previously conferenced with the at least one second representative; receive user input selecting one of the at least one second representatives for conference connection; and establish an operative connection among the user device, a representative system associated with the representative, and a second representative system associated with the second representative over which the user, the representative and the second representative can conduct an audio-visual conference.

According to some embodiments of the invention, a computer program product includes a non-transitory computer-readable medium comprising a set of codes for causing a computer to: determine that an operative connection is being established between a user device of the user and a system associated with the financial institution, such that the user and the representative of the financial institution may conduct the conference; recognize the user as a customer enrolled in a representative pre-selection program; determine at least one representative from a pool of potential representatives, the at least one representative determined for presentation to the user for user selection and determined based at least in part on the user having previously conferenced with the at least one representative; and receive user input selecting one of the at least one representatives for conference connection.

In some embodiments, the pool of potential representatives comprise at least one representative assigned to the user, the at least one representative assigned to the user being a loan officer, financial planner, or personal banker.

In some embodiments, the computing module is further to cause the processor to: determine at least two representatives from a pool of potential representatives, wherein the user has previously conferenced with each of the at least two representatives; determine a ranking of the at least two representatives based at least in part on feedback received from the user; and initiate presentation of the at least two representatives in an order corresponding to the ranking or presentation of the ranking.

In some embodiments, the computing module is further to cause the processor to: initiate presentation of the at least one representative to the user for user selection, the presentation comprising: initiating presentation of an image of the at least one representative; and initiating presentation of information associated with the at least one representative, the information comprising the representative's name, at least one personal interest of the representative, education information, and experience information.

In some embodiments, the computing module is further to cause the processor to: in response to receiving the user input selecting one of the representatives for connection, determine that the selected one of the representatives is unavailable for conference connection; determine a second one of the representatives for conferencing with the user based at least in part on a recommendation from the selected one of the representatives; and establish an operative connection between the user device and a representative system associated with the second representative over which the user and the second representative can conduct an audio-visual conference.

In some embodiments, the computing module is further to cause the processor to: receive user preference information indicating the user's preference for at least one characteristic associated with a desired representative; in response to receiving the user input selecting one of the representatives for connection, determine that the selected one of the representatives is unavailable for conference connection; determine a second one of the representatives for conferencing with the user based at least in part on at least one characteristic being associated with the second one of the representatives; and establish an operative connection between the user device and a representative system associated with the second representative over which the user and the second representative can conduct an audio-visual conference.

In some embodiments, the computer program code is further to cause the processor to: in response to receiving the user input selecting one of the representatives for connection, establishing an operative connection between the user device and a representative system associated with the representative over which the user and the representative can conduct an audio-visual conference; determine that a second representative is needed for the conference; determine at least one second representative from a second pool of potential representatives, the at least one second representative determined for presentation to the user for user selection and determined based at least in part on the user having previously conferenced with the at least one second representative; receive user input selecting one of the at least one second representatives for conference connection; and establish an operative connection among the user device, a representative system associated with the representative, and a second representative system associated with the second representative over which the user, the representative and the second representative can conduct an audio-visual conference.

BRIEF DESCRIPTION OF THE DRAWINGS

Figure 1:
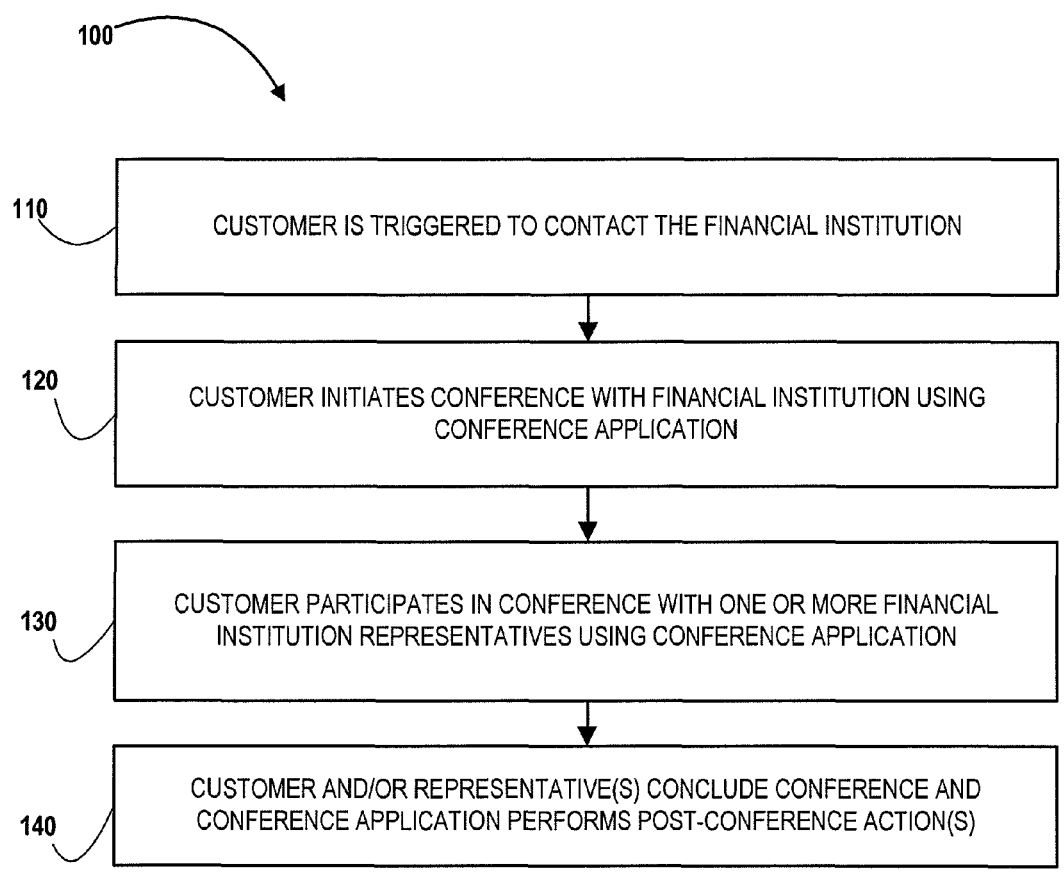
Figure 2:
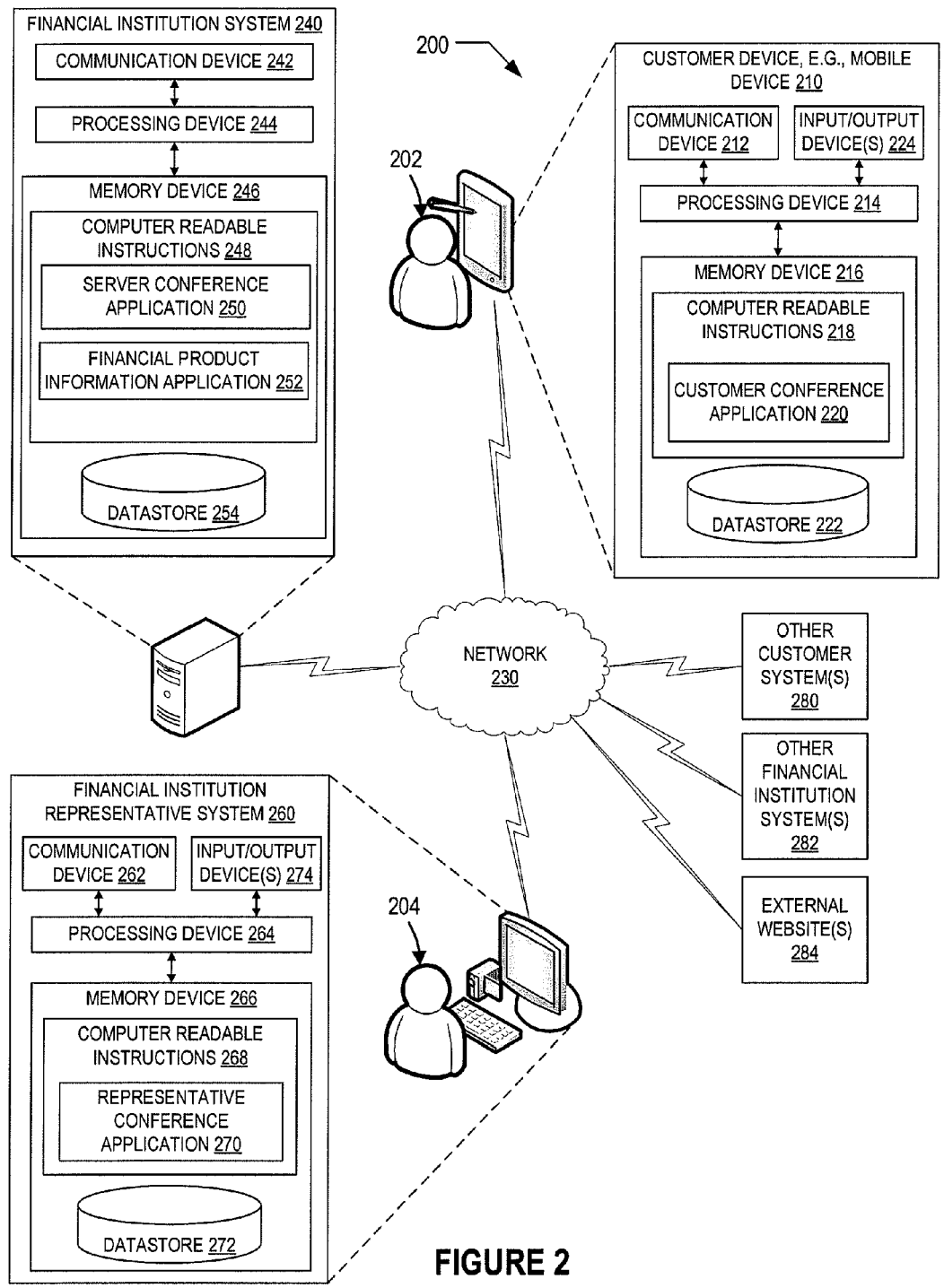
Figure 3:
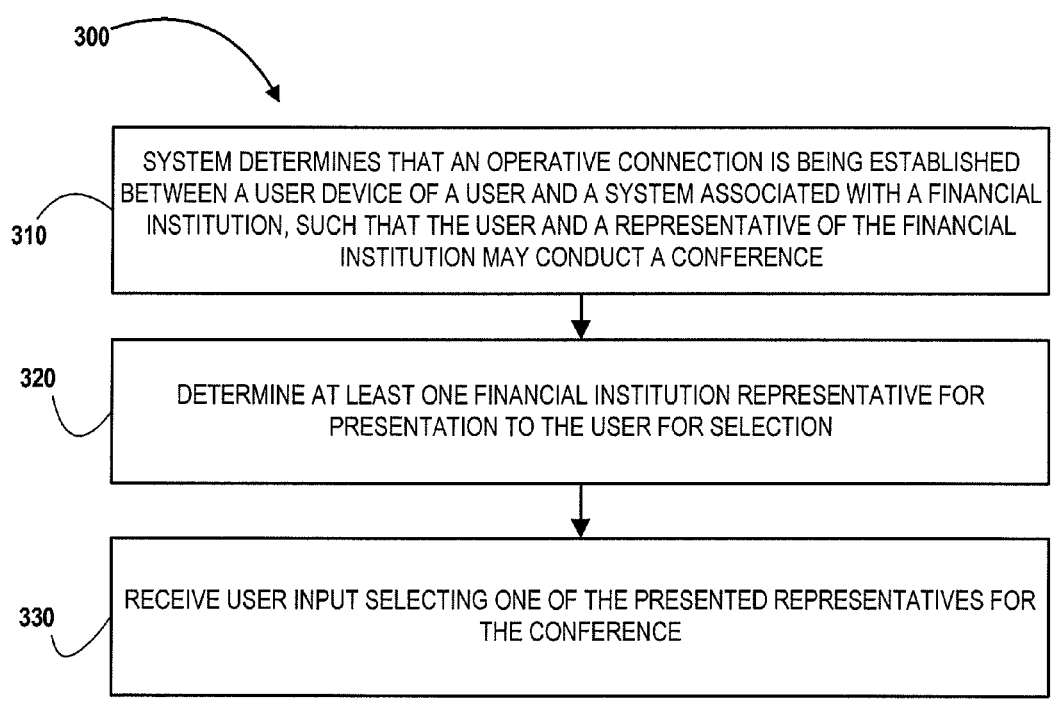
Figure 4:
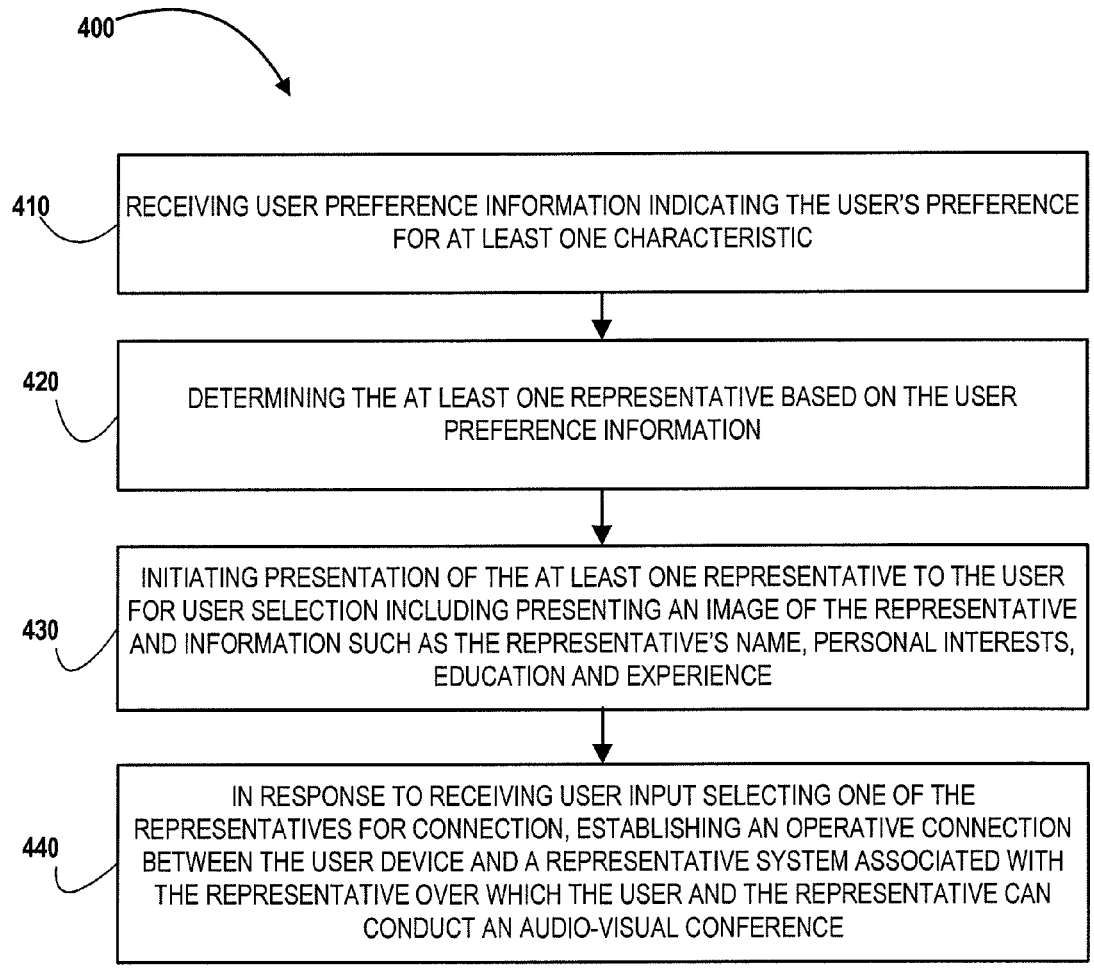
Figure 5:
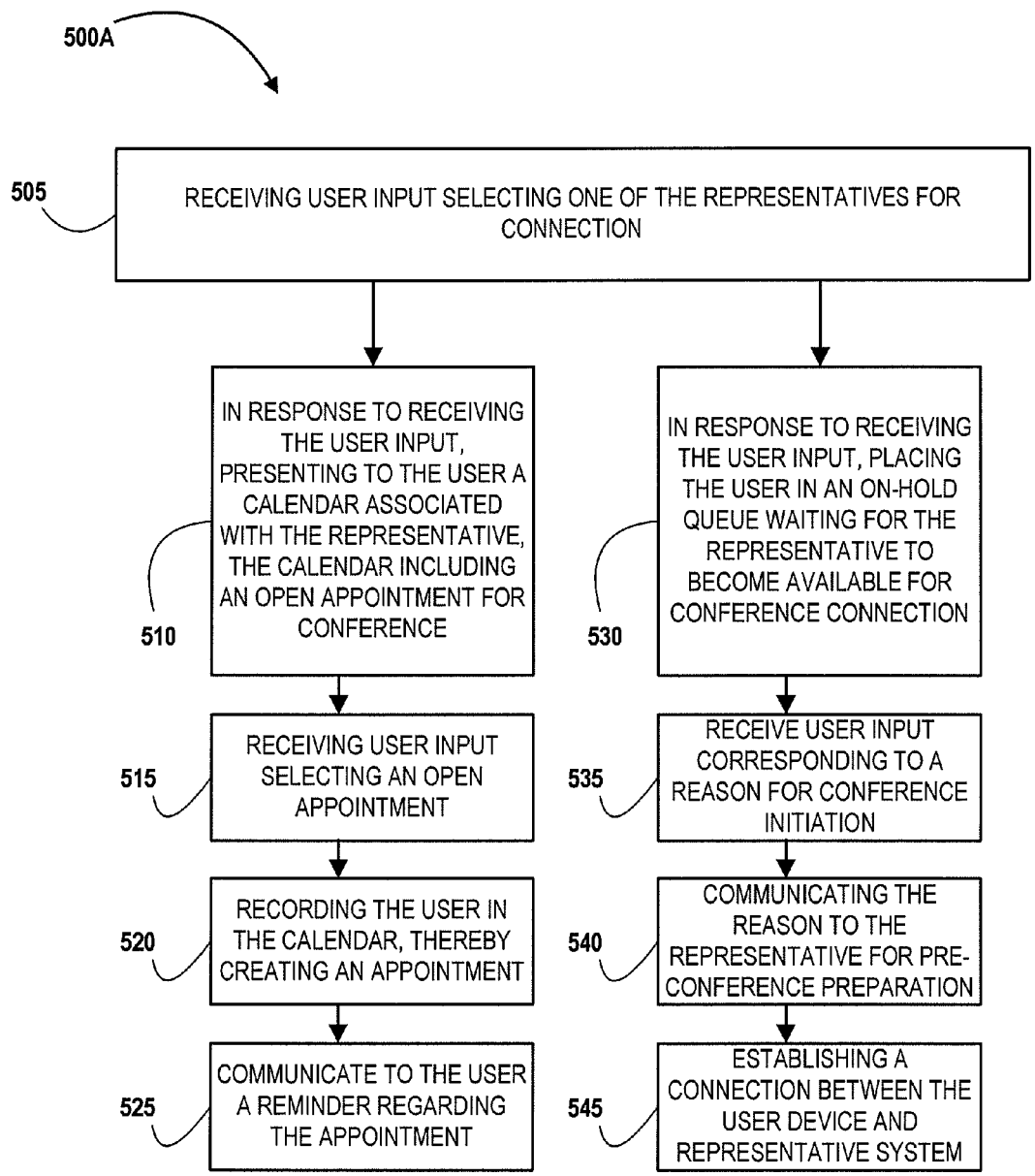
Figure 6:
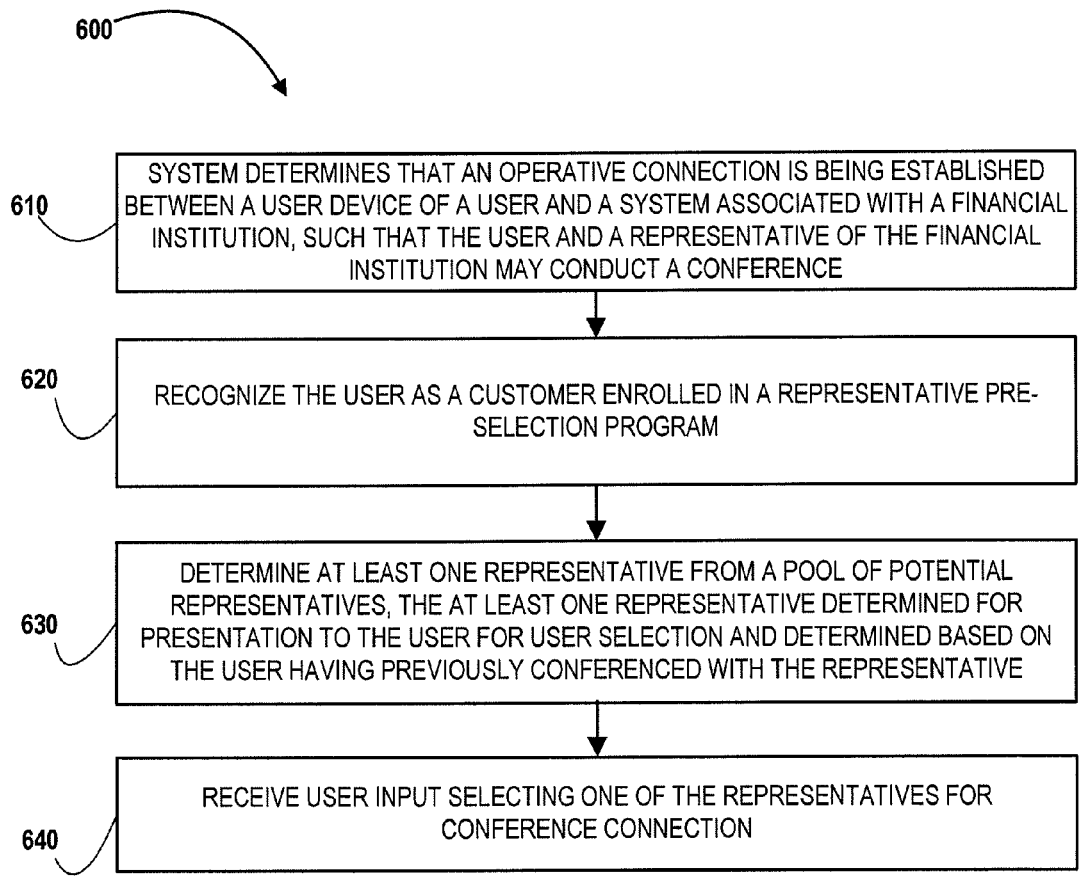
Figure 7:
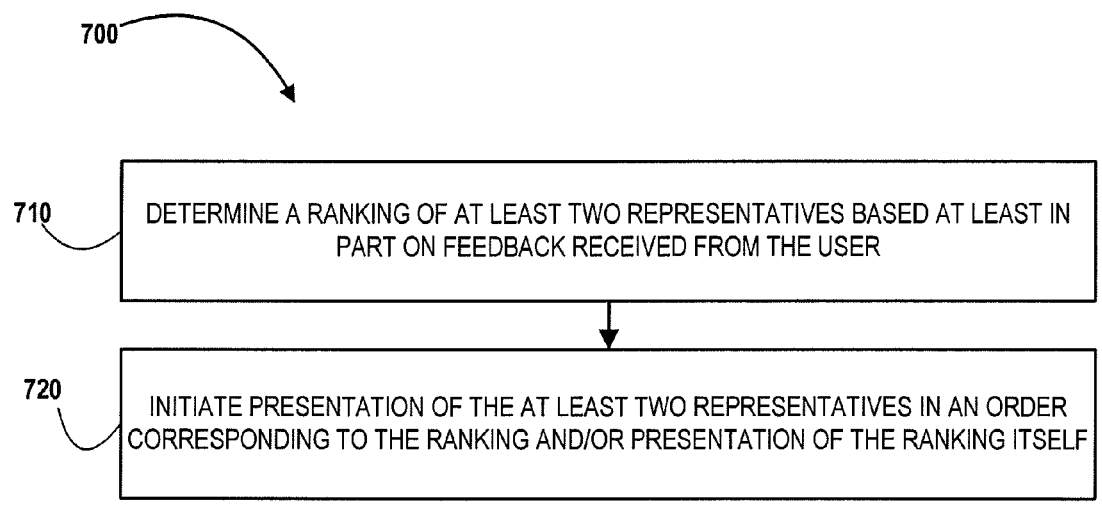
Figure 8:
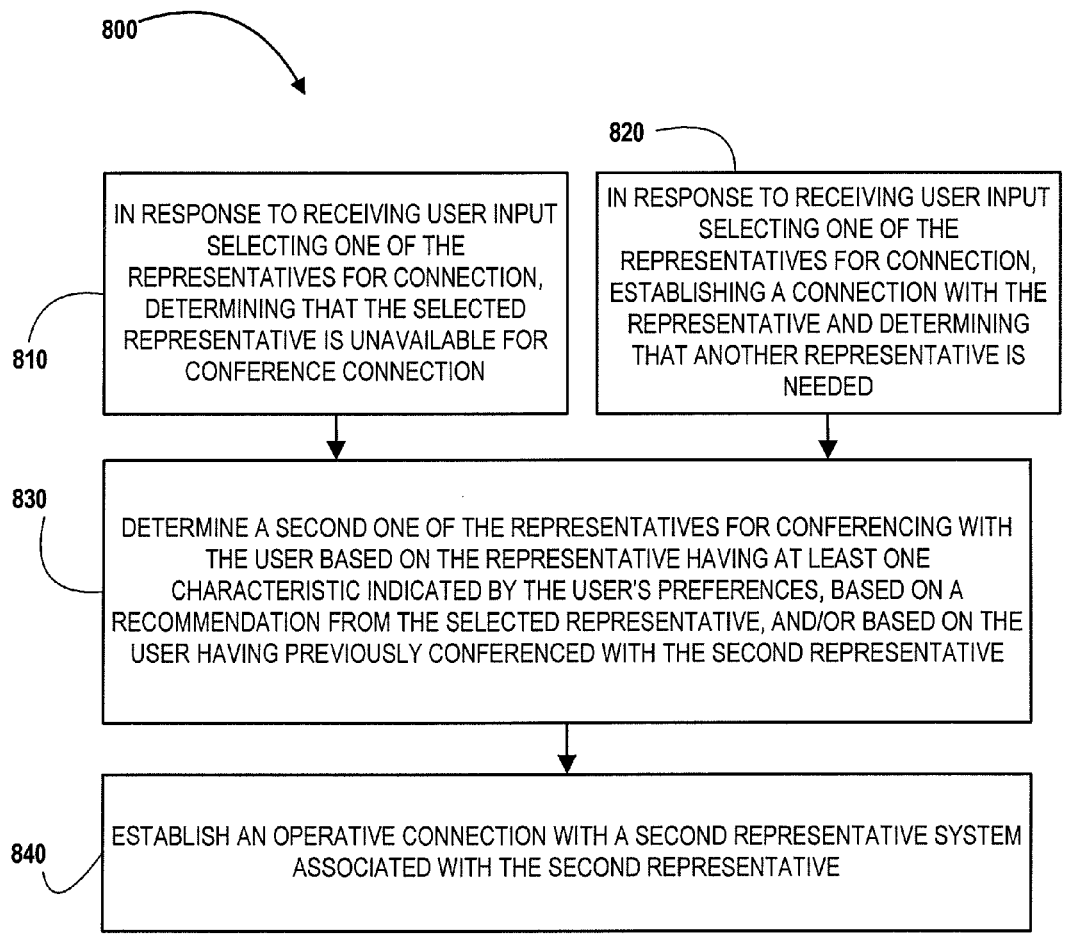
Figure 9:
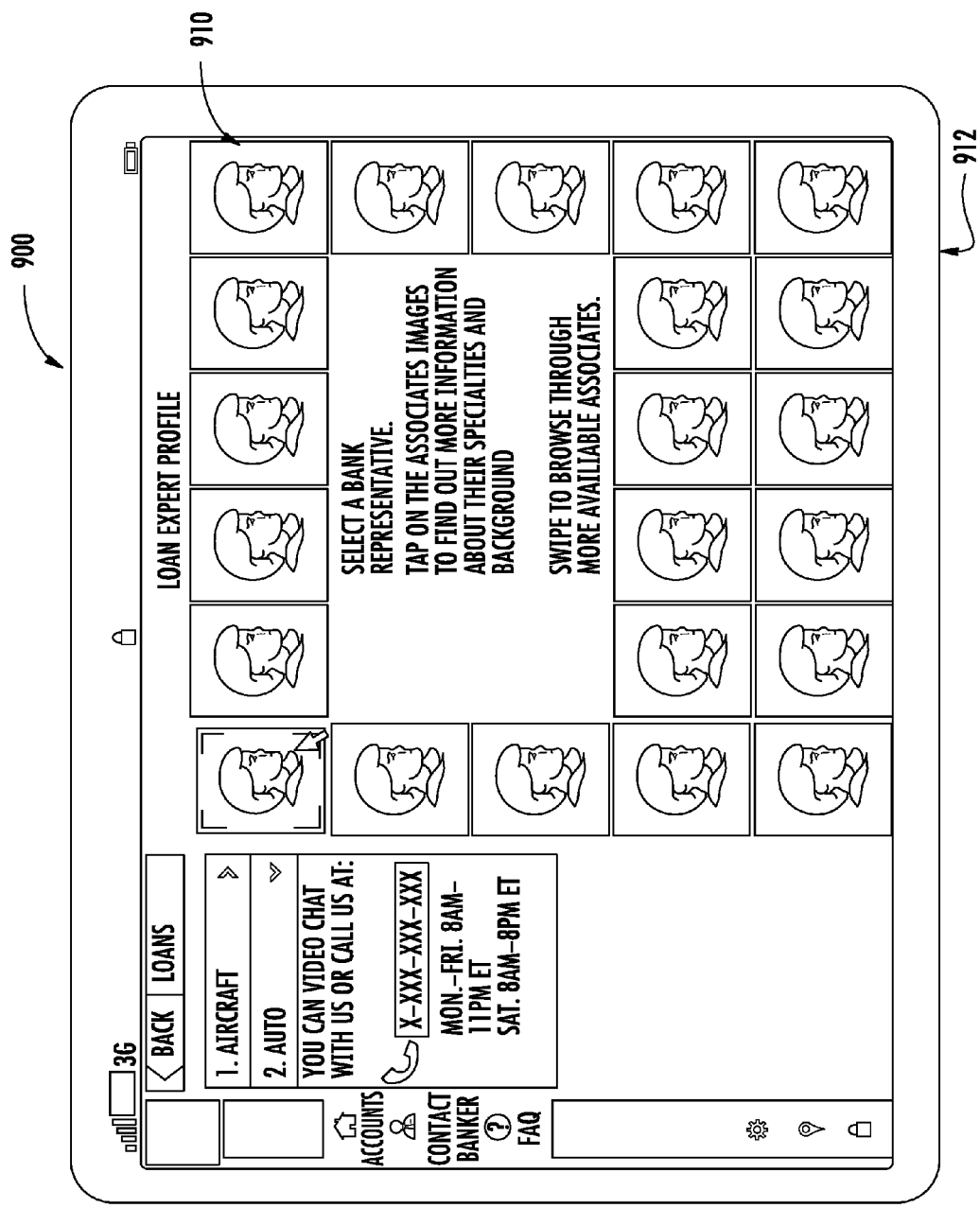
Figure 10:
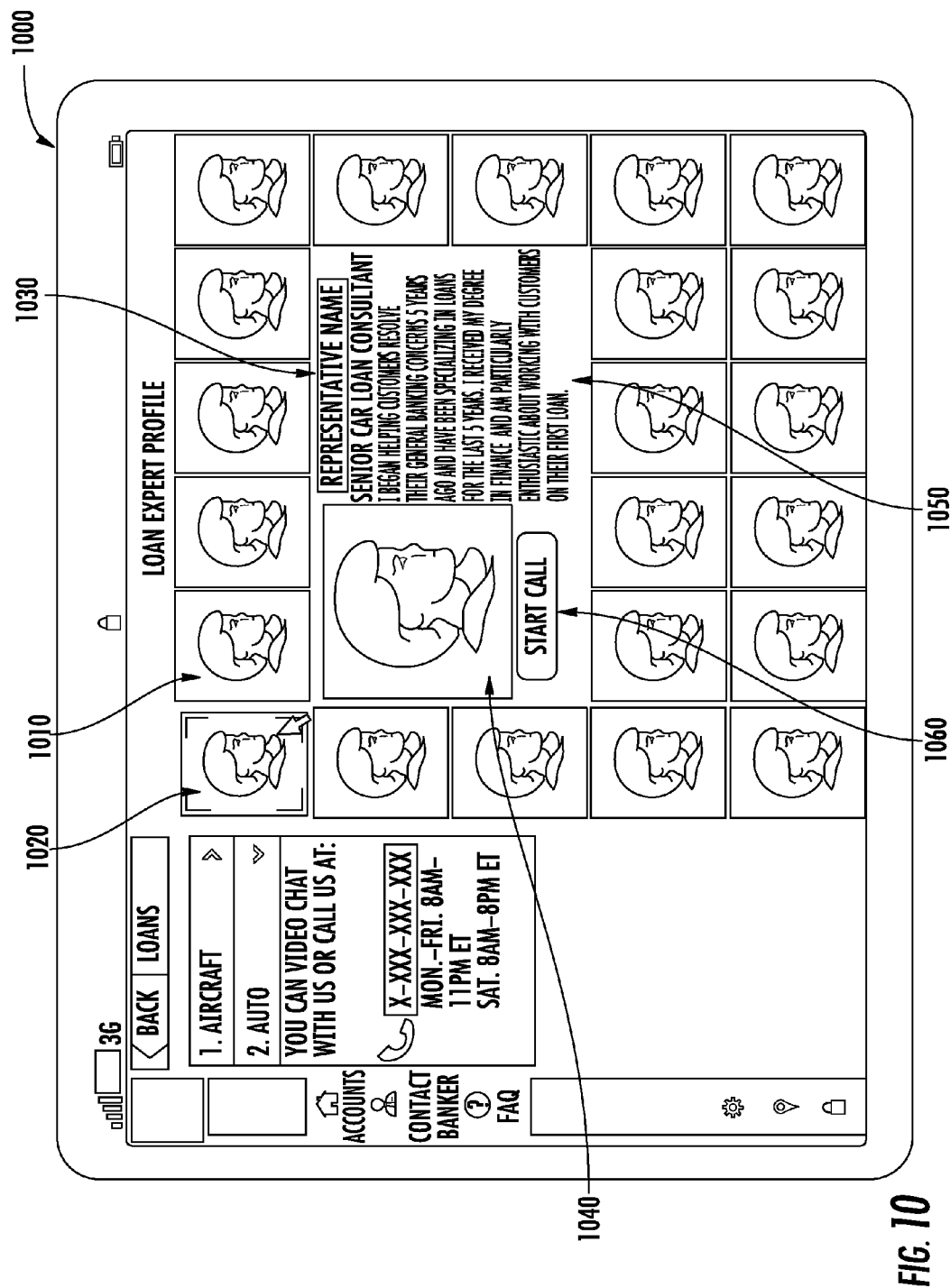

Having thus described embodiments of the invention in general terms, reference will now be made to the accompanying drawings, where:

FIG. 1 is a high level flowchart illustrating a general process flow for providing an interactive conference system, in accordance with embodiments of the invention;

FIG. 2 is block diagram of an environment for providing an interactive conference system, in accordance with embodiments of the invention;

FIG. 3 is a flowchart illustrating a general process flow for assisting a user to select a customer service representative of a financial institution in preparation for a customer service conference, in accordance with embodiments of the invention;

FIG. 4 is a flowchart illustrating a general process flow for assisting a user to select a customer service representative of a financial institution in preparation for a customer service conference, in accordance with embodiments of the invention;

FIG. 5 is a flowchart illustrating a process flow for assisting a user to select a customer service representative of a financial institution in preparation for a customer service conference, in accordance with embodiments of the invention;

FIG. 6 is a flowchart illustrating a process flow for assisting a user to select a customer service representative of a financial institution in preparation for a customer service conference, in accordance with embodiments of the invention;

FIG. 7 is a flowchart illustrating a process flow for assisting a user to select a customer service representative of a financial institution in preparation for a customer service conference, in accordance with embodiments of the invention;

FIG. 8 is a flowchart illustrating a process flow for assisting a user to select a customer service representative of a financial institution in preparation for a customer service conference, in accordance with embodiments of the invention; and FIGS. 9 and 10 are screenshots of exemplary user interfaces for implementing an interactive conference system, in accordance with embodiments of the invention.

DETAILED DESCRIPTION OF EMBODIMENTS OF THE INVENTION

Embodiments of the invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention enable customers to interact with financial institution representatives over video conferencing and/or audio conferencing using a conferencing application running on, for example, a financial institution server and/or the customer's notebook computer. The variety of features may provide a customer an unprecedented balance of convenience, personalization, and exceptional customer service. Before or at the beginning of a call, a customer is given a set of representatives. The customer may select a representative based on information provided about the representatives such as their numbers of years of experience. While the customer is waiting for the call to commence, the customer may be provided information indicating the wait time until the call commences and may be given relevant information or links to information using the conference application, such as by a split screen showing relevant information as well as hold time information. In some cases, the customer is given an opportunity to play games or navigate the Internet for topics unrelated to the topic of the call. Once on a call, customers are given an opportunity to view and edit documents related to the call. In some instances, customers may collaborate on document creation and modification with the representative and the representative (or customer) may be able to point out sections of relevant documents to the customer such as by highlighting or inserting notes. The conferencing application may also generate an electronic call summary that may be specialized for the representative or the customer. This call summary may record the spoken words and convert them to text and correlate the text with the other interactions between the customer and the representative, for example, noting within the call log that the representative presented the customer with a specific document at a particular point in the conversation. The conferencing application may enable a customer to schedule a future conference with a representative with whom the customer has previously interacted (referred to as a "primary representative") or with a representative recommended by the primary representative. In some situations it may be advantageous for the conference to switch devices and/or include additional participants, so the conference application provides the customer flexibility in forwarding the call to other devices or back to the original device and/or inviting other participants onto the call.

Referring now to FIG. 1, a flowchart illustrates a process flow 100 representing the fundamental stages of a customer's interaction with the financial institution. These stages were discerned through a significant customer research project. The first stage of customer interaction, at Block 110, is the customer is triggered to contact the financial institution. Typically, the customer has a question about a financial product such as a product the customer is considering or a product the customer already owns. Whatever triggers the customer to initiate contact with the financial institution provides context for the conference regarding subject matter and may also provide the environment and circumstances surrounding the customer. Accordingly, various embodiments of the conferencing application were designed to address the needs and concerns of those customers who initiate conferences with the financial institution based on triggers. In order to maximize the customer experience and satisfaction with the conference application, and based in part on the triggers to the customer, the conference application, in some embodiments, ensures that the customer can make a personal connection with one or more financial institution representatives who may be able to provide expert advice to the customer regarding complex products or issues over a private and secure platform that overcomes common challenges to existing video technologies.

The next stage of customer interaction, at Block 120, is the customer initiating a conference with the financial institution using the conference application. The customer, having been triggered by an interest in a product or a question about a product or otherwise, may want to speak with a customer service representative. The customer, however, may not want to take the time to physically visit a brick and mortar financial institution location. The conference application provides an alternative to visiting a physical location along with numerous advantages to doing so such as the ability to electronically create and edit documents in collaboration with a representative.

In order to initiate a conference, a customer may use a customer device such as a computing device like a computer (desktop, laptop, tablet or the like), a smartphone or other computing device as represented by computing device 210 of FIG. 2. The computing device may have a conference application installed in its memory. The conference application may also be installed and running on one or more financial institution servers such that customers running the conference application on a customer device can communicate with the conference application running at the financial institution. The conference application for the customer device may be the same or different than the conference application running on the financial institution servers.

The conference application provides the customer an opportunity to select a representative with whom to speak in some embodiments. Several representatives may be presented to the customer in a list of representatives. In some embodiments, each of the representatives are presented by display of a still, moving, and/or live picture of the representative as well as some information about the representative. In some cases, the representative's professional qualifications and experience are presented to the customer for consideration, and in some cases, additional information about the representative is presented. For example, personal interest information may be presented, for example, the representative's hobbies, location, and favorite sports teams or favorite television shows may be presented to the customer for consideration. Once the customer has selected a representative to speak with, the application places the customer "on hold" for an immediate conversation with the representative or may present the customer with a date and time in the future for scheduling a call with the representative. The application may then remind the customer of the scheduled call in a variety of ways, such as using electronic calendar entries, alarms and the like. Either prior to an immediate call or a scheduled call, the customer may input some pre-call information to provide context for the call with the representative.

In some cases, such as for a premier customer, the application may provide all of the financial institution representatives assigned to the customer or with whom the customer has previously spoken. For example, the loan officer, the financial planner, the personal banker and the like associated with the customer may be provided to the customer for selection during the pre-conference representative selection. The application may also rank the representatives (either or both of assigned representatives and representatives previously spoken with) based on customer input, experience in relevant field or otherwise.

While the customer is on hold waiting for a conference call, the customer may be presented with one or more time consuming options while holding. The customer may be presented with information regarding the customer's wait until the connection with a live representative is made, such as a visual depiction of the queue of customers waiting for customer service related to, for example, a specific category of assistance or a specific representative. The visual depiction may also include information related to the time to connection and may include a "snooze" virtual button or other virtual input mechanism that receives customer input indicating the customer's desire to postpone the live connection with the representative. During the hold, the customer may be presented with informational videos relevant to the upcoming call. In some instances, the videos may be recordings of the representative for whom the customer is waiting or another representative familiar to the customer. Similarly, the customer may be presented with a widget or a portion of the application screen, such as a portion of a split screen for performing onsite research or offsite research, providing games to play while waiting, providing a data consumption bar during the hold as well as during the call, providing choices for connection speed (and possibly quality of video/audio, providing a listing of documents necessary and/or useful for the call and the like. In some instances, a widget or split screen portion is provides access to the financial institution's online banking platform so that the customer may access information regarding his or her accounts maintained by the financial institution.

Referring again to FIG. 1, the next stage of customer interaction, at Block 130, is the customer participates in a conference with one or more financial institution representatives using the conference application. During the conference, the customer may be provided with various functions for improving the conference experience, for example, document sharing, visual navigation, video chat and call controls and multiple participants.

The application may present to the customer persistent call controls, such as for accessing an on demand customer service connection or other representative connection. An interface of the application may provide the customer an opportunity to highlight or select portions of text or graphics presented on the interface, such as highlighting portions of documents that are being discussed between the customer and the representative. The control of these shared documents may be retained by the representative or may be with the customer or both. The representative may direct the discussion away from a standard document to something more interactive such that the customer may have the ability to access portions of the document and enter/change information in the document. In some instances, the application may allow the customer and the representative to switch control of the document back and forth as necessary during the conference.

During a conference, a customer and/or a representative may need to bring one or more other people into the conference. This may be done by the customer, for example, by the customer vouching for the additional participant and, in some embodiments, verifying the additional participant electronically. In some cases, credentialing of the additional participant is by a verification process. When an additional representative is required on the conference, an interaction log may be provided to the new associate to bring him or her up to speed quickly. The customer may have a trusted group of representatives who may be quickly brought into a conference. If the customer has not interacted with a particular representative before, the customer may provide a confirmation of acceptance of a representative, based on pre-existing filters, review of provided representative information or the like.

In some embodiments, during a conference using the application, a customer is given an opportunity to promote and/or demote levels of connectivity. For example, the customer may choose to change from textual to audible to visual to audiovisual interaction with the financial institution representative and/or the opposite. Such channel hopping may be logged, such as in an interaction log. Also, the customer may auto-forward a connection initiated from a representative from one device to another device, such as from the customer's tablet computer to a smartphone. In some cases, the customer may forward the connection back to the original device or use a cross- and/or dual-channel presentation. For example, audio of the conference may be presented using one device and video may be presented using another device.

At Block 140, the customer and/or the representative concludes the conference and the conference application may perform one or more post-conference actions. For example, an e-receipt (also called an interaction log) may be finalized.

The interaction log may created automatically by the application during the conference and my include a recording and/or a textual representation of the words spoken during the conference. The interaction log may but used by the customer and/or the representative as a record of the call and the information/document shared during the call. From the perspective of the customer, the log may be used as a reference when completing tasks after the call has ended such as gathering or completing additional documents or following up as necessary. In addition to voice recordings and written text, the log may include, for example, copies of documents discussed, links to other information, highlighting and or notes taken during the call, and possibly timestamps indicating when in the call various actions occurred or documents were reviewed/highlighted and the like. The log may incorporate manual input as well. For example, the log may accept confirmation of portions of a conversation from one or both participants. In some instances, one or both participants may be able to remove unnecessary or repetitive portions of the log as desired. The log may include inset indications of highlighting of interface items and/or documents discussed during the conference. The participants of the conference may have different versions of the log, such as versions allowing the customer to comment/edit within the log manual and versions allowing the representative to comment/edit within the log manually.

In some embodiments, after the call has been completed archives of the interaction log and any documents discussed, created, edited or otherwise are stored by the financial institution and/or by the customer device (for offline access). These documents may be retrieved by the customer, such as by using the application or by logging into the customer's online banking website portal. In some embodiments, the application prompts the customer whether to store one or more of the log and/or the other document(s) discussed and prompts the customer regarding the storage location. In some embodiments, the customer is also given the option of communicating the log and/or other documents to one or more electronic destinations such as to one or more email addresses or the like.

Referring now to FIG. 2, a block diagram illustrates an environment 200 wherein a customer 202 participates in a conference with a financial institution representative 204 using a customer device 210 and a financial institution representative system 260, respectively. The environment also may include a financial institution system 240, other customer systems 280, other financial institution systems 282 and/or external websites 284. The systems and devices communicate with one another over a network 230 and perform one or more of the various steps and/or methods according to embodiments of the invention discussed herein.

A customer device 210 may be configured for use by a customer or other user, for example, to access one or more other financial institution applications such as the customer conference application 220. The customer device 210 may be or include a computer system, server, multiple computer system, multiple servers, or some other computing device configured for use by a user, such as a desktop, laptop, tablet, or a mobile communications device, such as a smartphone. The mobile device 210 has a communication device 212 communicatively coupled with a processing device 214, which is also communicatively coupled with a memory device 216 and one or more input and/or output devices 224, for example, an image capture device such as camera and/or a microphone. The processing device 214 is configured to control the communication device 212 such that the customer device 210 communicates across the network 230 with one or more other systems, for example, the financial institution representative system 260. The processing device 214 is also configured to access the memory device 216 in order to read the computer readable instructions 218, which in some embodiments include a customer conference application 220. The memory device 216 also may have a datastore 222 or database for storing pieces of data for access by the processing device 214.

The financial institution representative system 260 may be a workstation used by a representative to communicate with customers using the conference application. In some embodiments, the financial institution representative system 260 may communicate with one or more of the other systems or devices and may perform one or more steps and/or one or more methods as described herein. In some embodiments, the financial institution representative system 260 includes a communication device 262 communicatively coupled with a processing device 264, which is also communicatively coupled with a memory device 266 one or more input and/or output devices 224, for example, an image capture device such as camera and/or a microphone. The processing device 264 controls the communication device 262 such that the financial institution representative system 260 communicates across the network 230 with one or more other systems or devices. The processing device 264 is also configured to access the memory device 266 in order to read the computer readable instructions 268, which in some embodiments include a representative conference application 270 having instructions for communicating with the customer conference application 220 running on the customer device 210 and/or the server conference application 250 running on the financial institution system 240. In some embodiments, the financial institution representative system 260 includes one or more datastores 272 for storing and providing one or more pieces of data used by the representative during conferences with customers.

A financial institution system 240 is a computer system, server, multiple computer systems and/or servers or the like. The financial institution system 240, in the embodiments shown has a communication device 242 communicably coupled with a processing device 244, which is also communicably coupled with a memory device 246. The processing device 244 is configured to control the communication device 242 such that the financial institution system 240 communicates across the network 230 with one or more other systems. The processing device 244 is also configured to access the memory device 246 in order to read the computer readable instructions 248, which in some embodiments includes a server conference application 250. The memory device 246 also has a datastore 254 or database for storing pieces of data for access by the processing device 244. In some embodiments, the representative conference application interacts with the server conference application to access information, document or other data for use during a conference call. In some embodiments, a financial product information application 252 retrieves information regarding financial products being discussed during a call between a customer and a representative and provides the information to the customer and/or the representative during the call and/or after the call has ended.

The applications 220, 250 and 270 are for instructing the processing devices 214, 244 and 264 to perform various steps of the methods discussed herein, and/or other steps and/or similar steps. In various embodiments, one or more of the applications 220, 250 and 270 are included in the computer readable instructions stored in a memory device of one or more systems other than the systems 240 and 260 or device 210. For example, in some embodiments, the application 220 is stored and configured for being accessed by a processing device of one or more other customer systems 280 connected with a representative through network 230. In various embodiments, the applications 220, 250 and 270 stored and executed by different systems/devices are different. In some embodiments, the applications 220, 250 and 270 stored and executed by different systems may be similar and may be configured to communicate with one another, and in some embodiments, the applications 220, 250 and 270 may be considered to be working together as a singular application despite being stored and executed on different systems. In some embodiments, the applications 220, 250 and 270 stored and executed by the customer device and/or an application stored and executed on one of the other systems is a stand-alone application 220 and does not necessarily communicate or rely on any other applications for data, processing or otherwise, except for providing a connection with a representative through the application 270.

In various embodiments, one of the systems discussed above, such as the financial institution system 240, is more than one system and the various components of the system are not collocated, and in various embodiments, there are multiple components performing the functions indicated herein as a single device. For example, in one embodiment, multiple processing devices perform the functions of the processing device 244 of the financial institution system 240 described herein. In various embodiments, the financial institution system 240 includes one or more of the financial institution representative system 260, the other financial institution systems 282, and/or any other system or component used in conjunction with or to perform any of the method steps discussed herein.

In various embodiments, the financial institution system 240, the customer device 210, the financial institution representative system 260 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 100, the other methods discussed below, or other methods, processes or steps discussed herein or not discussed herein.

According to embodiments of the invention, an interactive conference system, which may include one or more of the financial institution system 240, the customer device 210 and/or the financial institution representative system 260, may provide an interactive conference between a representative of the financial institution and a user or customer. When "system" is used in general, that is, without referring to a specific system, it should be understood that one or more of the systems and device discussed with reference to FIG. 2 may be performing the method step or function being discussed. The system may provide the user an opportunity to browse through a listing of available financial institution representatives, and in some embodiments, each representative is presented along with an image of the representative and some information about the representative. Allowing the user an opportunity to select a representative recreates the personal nature of an in-person interaction that may be achieved by visiting a branch of the financial institution.

In some embodiments, for example, the user is given an opportunity to select a department or topic area within the financial institution using a visual navigation feature that provides an intuitive system for the user to locate the department relevant to the call or conference. Once the user has selected the department relevant to the conference, the user is provided with an interface presenting multiple representatives available for the conference, such as the interface shown in the screenshots of FIGS. 9 and 10.

In some embodiments, users are initially shown a number of representatives, such as ten (10), fifteen (15), twenty (20), as shown in the screenshots twenty-two (22) or any other number of representatives. If the user would like to consider additional options, the user can scroll through additional pages of representatives, such as by swiping the screen of the user device. In some embodiments, each representative has a job title, image, and information about the representative such as personal interests, education, experience, and/or a personal statement. The personal statement or note may be a short discussion or interesting fact about the representative. In some embodiments, the presentation also includes information that may be relevant to the user, such as the languages spoken by the representative.

In some embodiments, the system determines information about the user, such as the user's preferred languages and/or interests and presents the user with a pool of representatives for selection that match the user's information, and in some embodiments, the user provides input, such as searching criteria or preferences regarding the user's desired representative, and the system filters the broad pool of representatives into the pool of representatives presented to the user for consideration. In some embodiments, the system ranks the representatives, and in some such embodiments, the system presents the ranked representatives in an order based on the ranking. The ranking may be based on the user's input or otherwise, such as based on the representative's experience in the department or in a particular specialty.

In some embodiments, the system retrieves information from one or more social networks, such as a personal social network or a professional social network. The information may provide a user/customer more information about a representative of the financial institution. For example, the system may retrieve personal interest information from a representative's social network site and present that information along with the presentation of the representative in the pool of available representatives for the user selection. In other embodiments, information may be retrieved from one or more social networks associated with the user/customer. Such information may be useful in filtering the pool of representatives for presentation to the user. For example, if the user's preferred language is known from the user's social network site, then the system may filter the pool of representatives based on those representatives who speak that language. In some embodiments, the information retrieved from one or both the user's social network site and/or the representatives' social network sites is/are used in determining the ranking of representatives for the pool of available representatives and may also be used in determining the order in which the representatives are presented to the user for consideration and selection. For example, if a customer has three attributes in common with an available representative (for example, a personal interest, a commonly attended school, and a similar geographic location), that representative may be assigned a higher ranking than another representative that only has two attributes in common with the user (for example, two personal interests). In some embodiments, the attributes are weighted. For example it may be more important to the user that someone is located in a similar geographic region, and therefore, a similarity in geographic region with a representative will weigh more heavily than a shared personal interest when the system is determining rankings of available representatives and order of presentation of the pool of available representatives.

Enabling the user to select a representative results in several benefits, both to the user and the financial institution. For example, the invention provides the user with the personal connection that accompanies face-to-face interaction. This increases the user's sense of trust, as the user feels more comfortable with a representative who he or she has chosen. Users may be seeking empathy, reassurance and flexibility from a representative and users generally may feel that the representative they choose is more likely to be accommodating. Also, choosing a representative may allow the user to select someone with whom they will be able to communicate more effectively, such as someone who shares a common language, which will improve the interaction results and efficiency.

Referring now to FIG. 3, a flowchart illustrating a general process flow 300 for providing an interactive conference system is provided, in accordance with embodiments of the present invention. In some embodiments, the system includes a memory; a processor; and a computing module stored in the memory, executable by the processor, and configured to cause the processor to: determine that an operative connection is being established between a user device of a user and a system associated with a representative of a financial institution, such that the user and the representative may conduct a conference; provide a document viewable by both the user and the representative during the conference; and enable the document to be edited by at least one of the user and the representative during the conference.

As discussed, an interactive conference system allows a customer or other individual to receive improved service from a financial institution. The benefits of the interactive conference system include, but are not limited to, more efficient review of documents, guided completion of documents and forms, personal assistance regarding customer queries, and secure and convenient storage of records associated with the conference. While the embodiments of the invention are primarily disclosed with respect to customers seeking assistance with financial queries, the system described herein may be adapted or used for other service industries such as government service providers, telecom services, or utility services.

In Block 310, the system determines that an operative connection is being established between a user device of a user and a system associated with a representative of a financial institution, such that the user and the representative may conduct a conference. In a general embodiment, a user seeks to establish a conference with a representative of a financial institution so that the user may receive personalized attention and assistance regarding a query the user may have. The operative connection of Block 310 may merely be the user starting the conference application on the user's device and initiating the process of establishing a conference with a representative of the financial institution, and may not constitute establishing the conference itself. The conference, as discussed below, may be established by the application once the user has selected a representative for conferencing.

The user may desire a mortgage and request assistance regarding mortgage rates, mortgage qualifications, and the application process. Assistance of a financial institution representative during an interactive conference would assist the user in navigating the mortgage application process. Of course, mortgage applications are merely an example and the user may receive assistance for a variety of queries or reasons during a conference. For example, issuance of other types of loans, refinancing of loans, establishing an initial or new account of any type, questions regarding account status and benefits, and so forth may be addressed in a conference between the user and the representative.

As used herein, an operative connection means a connection that operates to connect at least two devices. The operative connection may be wired or wireless. Data and information may be transferred over the operative connection such that the at least two devices are in communication. For example, the user may request a conference over the Internet. The user may begin establishing a connection between the user's device and a device at the financial institution. In some embodiments, the user logs into the user's account at the financial institution, such as on a webpage or application, in order to establish an operative connection between the user's device and the financial institution. In some embodiments, the user establishes the operative connection based on a network connection. For example, the user may have access to a secure connection and therefore be able to establish the operative connection. In an embodiment, the user's device is required to have security software so that the operative connection has an enhanced level of security. For example, the operative connection may be encrypted so that the conference can only be accessed by devices and/or individuals having permission to access the conference.

In some embodiments, the system determines that the operative connection is being established but that the operative connection has not been completed. In this embodiment, the operative connection has not yet been established but the user, the representative of the financial institution, and/or a third party has initiated the operative connection. The user may have requested a conference over the phone, via email, via text message, or via a website. In some embodiments, the user initiates the operative connection but in other embodiments the representative of the financial institution initiates the operative connection. For example, the user may be speaking with the representative on the phone. The representative determines that a video conference would be a more productive means of communication and offers to initiate a video conference with the user via the user's computer, laptop, tablet, or mobile device (e.g., smartphone or the like). In some embodiments, third parties such as merchants may facilitate the conference. For example, a user may be visiting a car dealership and have questions regarding a car loan. The car dealership may facilitate or initiate the conference with the financial institution on behalf of the user. In this embodiment, while the third party may initiate the conference, the third party does not have access to the conference until the user permits the third party access, as will be discussed in greater detail at a later point.

In further embodiments, the system determines when the operative connection is established. Establishment of the operative connection does not mean that the conference has started. For example, the operative connection may be established but the user may be in a queue waiting for the next or for a requested representative. In some embodiments, the user is provided options during the period between when the operative connection is established and when the conference begins. For example, the user may be able to upload documents, post questions regarding the purpose for the conference, view documents provided by the financial institution (e.g., FAQs), conduct searches for relevant information, play games, access personal documents on the user device, or other activities. In an exemplary embodiment, the time before the conference begins is provided to the user in a visual format.

The user device may be a desktop computer, a laptop computer, a tablet, a mobile device, or another type of computing device. For example, the user device may be a gaming system, a kiosk at a merchant or a public locale, or a rental device. In an exemplary embodiment, the user device is a computing device such as a tablet that allows the user to conduct a video conference, e.g., the user device includes a video camera, a microphone, speakers, and a display screen. In an embodiment, the user device is the previously discussed customer device.

As used herein, a user may be a customer of the financial institution but is not required to be. For example, the user may be an existing customer of the financial institution, meaning that the user has had at least one account with the financial institution either currently or previously active. The user may also be a new customer or a prospective customer of the financial institution. For example, the user may be an individual searching for competitive mortgage rates and discussing mortgage applications with multiple financial institutions. The user may not have a current or previous relationship with the financial institution but is considering developing one and would like to ask questions of a representative regarding the possibility of becoming a customer.

The system establishes the operative connection between the user device and a system associated with the representative of the financial institution. The system associated with the representative is to be broadly construed as being a set of hardware and software that provides the representative access to the conference. The system may include at least a portion of the financial institution system, e.g., the server and databases associated with the financial institution. For example, the system associated with the representative may provide access to a user's financial transaction history for a plurality of accounts. In some embodiments, the user first provides an access code or authentication code allowing the user and the representative to access portions of the user's data on the financial institution server. The system associated with the representative may also include the specific hardware and software that allows the representative to participate in the conference. This hardware and software may include the video camera, speaker, microphone, headset, display, and/or operating system for connecting with a variety of user computing devices.

In an embodiment, the representative is an employee of the financial institution. The representative may be a general customer service representative or a specialized representative. In an embodiment, the user is able to select the representative that the user would like to work with in the conference. In another embodiment, the representative is a contractor that works with the financial institution to provide customer service. For example, the contractor may provide specialized customer service in an area that financial institution employees do not specialize.

For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a debit account, a credit account, a non-monetary user profile that includes only personal information associated with the user, or the like. The account is associated with and/or maintained by the entity. In other embodiments, an entity may not be a financial institution.

The operative connection established between the user device and the system associated with the representative of the financial institution facilitates a conference between the user and the representative. In an exemplary embodiment, the conference is a video conference between the user and the representative. The conference allows interaction between the user and the representative. In some embodiments, the conference is a teleconference based on a phone system as well as an interactive display screen. In a still further embodiment, the conference is an interactive screen and text-based communication. For example, the user may be in a public locale and not desire audible communication with the representative. Instead, the user may communicate with the representative via text, such as by typing comments on a keyboard, while still have access to the interactive display screen.

In Block 320, the system determines at least one financial institution representative for presentation to the user for selection. This determination may be made based on the department that the user selected by inputting their reason for initiating the conference. The determination of the pool of representatives may be based on some attribute of the representatives, such as the representatives' respective experience, and the representatives may be ranking and presented to the user based on the ranking, such as highest ranking first. In some embodiments, the determination of the pool of representatives is based on all the available representatives within the department selected by the user. In some, the pool of representatives are presented to the user based on the wait time for each of the pool of representatives. For example, one representative may have an estimated wait time of one (1) minute whereas each of the other representatives available for conference may have a wait time greater than one (1) minute. Accordingly, the pool of representatives may be arranged based on this ranking based on wait time. The representative having only a one (1) minute wait time may be presented to the user in the first page of available representatives. In some embodiments, the wait time for each available representative may be provided to the user.

In some embodiments, the system provides the user with one or more recommended available representatives in addition to providing the user with the opportunity to select someone from a larger pool of representatives. For example, the user may need a mortgage expert and there may be twenty (20) available mortgage experts, however, the system may recommend the user select a specific representative because that representative is available immediately whereas the other representatives are all currently on other conferences and, therefore, have a wait time or the system may recommend the user select another representative because that representative is a specialist in second mortgages or refinancing, and the system recognizes that the user already has a mortgage product with the financial institution. In some instances, the system asks the user one or more questions to better determine the user's intended purpose for the conference, and in this way may better filter the broad pool of available representatives to suit the needs of the user. This may also better allow the system to recommend one or more representatives in particular to the user from the pool of representatives presented to the user for selection.

In Block 330, the system receives user input selecting one of the presented representatives for the conference. In some embodiments, the interface receives user input, such as a "tap" or detected touch from the user associated with one of the representatives that is presented to the user for selection. Once the user has selected the representative, the system may then provide additional information for the user to consider or may immediately initiate a connection between the user and the representative. In some instances, of course, the representative may already be on another conference, in which case, the system may place the user "on-hold" for the selected representative. In some instances, while on-hold the user may be provided additional functionality such as the opportunity to search the financial institution website for relevant information, search outside the financial institution website, review the user's accounts using online banking, play games, search the Internet, view instructional materials such as videos or otherwise. In some embodiments, the wait time or number of users in front of the user in line for the representative are presented to the user graphically.

Referring now to FIG. 4, a flowchart illustrating a general process flow 400 for providing an interactive conference system is provided, in accordance with embodiments of the present invention. In Block 410, the system receives user preference information indicating the user's preference for at least one characteristic of the user's desired representative, and in Block 420, the system determines the at least one representative based on the user preference information. For example, the user may prefer that the representative have a minimum number of years of experience working with clients regarding their investment portfolios. In this example, the system may filter the broad pool of available representatives (that is, those representatives in the financial planning department) down to only those representatives that meet the user's criteria. In some embodiments, the user provides multiple criteria for searching or filtering the available representatives. To continue the example above, the user may note that the user prefer to speak a particular language in addition to preferring a high level of experience. Accordingly, the system may further filter the available representatives and then present those meeting the user's criteria to the user for selection. In this regard, the user may actually be able to discuss the user's questions with a qualified representative who may be unavailable for a face-to-face meeting local to the user.

In Block 430, the system initiates presentation of the at least one representative to the user for user selection including presenting an image of the representative and information such as the representative's name, personal interests, education and/or experience. As discussed elsewhere herein, an image of the representative may be presented alongside the other representatives' images in the pool of representatives for the user's initial selection, and upon initial selection, the system may provide additional information about the representative to the user for final selection. In other embodiments, some information about each representative is provided to the user along with the image. For example, each representative's name, languages spoken, level of experience and/or other information may be presented along with the representatives' images. In embodiments where the user provide input that was used to determine the pool of representatives presented to the user for selection, some or all the characteristics or attributes of the representatives relevant to the user's input are presented initially alongside the representatives' images. In some embodiments, when the user selects the representative from the pool, a connection is immediately initiated, and in other embodiments, the system may provide additional information about the representative and a prompt for the user to confirm the user's desire to connect with the selected representative.

In Block 440, in response to receiving user input selecting one of the representatives for connection, the system establishes an operative connection between the user device and a representative system associated with the representative over which the user and the representative can conduct an audio-visual conference. In some embodiments, the connection established is a direct connection between the user device and the representative system, and in other embodiments, the connection is established through a server or financial institution system such as system 240.

Referring now to FIG. 5, a flowchart illustrating a general process flow 500 for providing an interactive conference system is provided, in accordance with embodiments of the present invention. In Block 505, the system receives user input selecting one of the representatives for connection. In some embodiments, in response to receiving user input selecting a representative, the system presents to the user a calendar associated with the representative, as represented by Block 510. In some embodiments, the calendar includes an open appointment for scheduling a conference with the representative. In Block 515, the system receives user input selecting an open appointment from the representative's calendar. In Block 520, the system records the user in the calendar, thereby creating an appointment between the user and the representative. In some embodiments, as represented by Block 525, the system communicates to the user a reminder regarding the appointment. This reminder may be in the form of entering a calendar entry on the user's calendar or may be another form of electronic communication such as an email, text message, phone call or the like.

In some embodiments, in response to receiving user input selecting a representative (Block 505), the system places the user in an on-hold queue waiting for the representative to become available for conference connection, as represented by Block 530. In Block 535, the system receives user input corresponding to a reason for conference initiation, and in Block 540, the system communicates the reason to the representative for pre-conference preparation. For example, as discussed above, the user may input information related to the user's reason for making the call or initiating the conference. For example, the user may have questions about a savings account. Accordingly, the system may then present the reasons for the user's call to the representative prior to connecting the user with the representative for the conference. In Block 545, the system establishes a connection between the user device and the representative system so that the representative may conduct a conference with the user.

Referring now to FIG. 6, a flowchart illustrating a general process flow 600 for providing an interactive conference system is provided, in accordance with embodiments of the present invention. In Block 610, the system determines that an operative connection is being established between a user device of a user and a system associated with a financial institution, such that the user and a representative of the financial institution may conduct a conference. As discussed above, this connection may be the user starting the conference application on the user's device so that the user may then conference with a representative of the financial institution. In Block 620, the system may recognize the user as a customer enrolled in a representative pre-selection program. For example, the customer may be considered a premier customer by the financial institution as determined by the customer's number of accounts maintained by the financial institution, the customer's amount of funds invested with the financial institution, or the customer's status as a member of the pre-selection program may simply be that the customer has enrolled in the program. Thus, the customer may already have relationships with one or more representatives of the financial institution.

In Block 630, the system determines at least one representative from a pool of potential representatives. The representatives are determined for presentation to the user for user selection and determined based on the user having previously conferenced with the representative. In some embodiments, the customer has actually worked with the representatives on a consistent basis, such that the representatives are "assigned" to the customer either officially by the financial institution or unofficially in that the customer and the representative have established a relationship by their interactions. In this regard, the system may determine that the customer has spoken with one or more specific representatives and therefore, provides those representatives to the customer for selection when the customer is initiating a conference. In Block 640, the system receives user input selecting one of the representatives for conference connection, and, of course, the system may then connect the customer with the selected representative as discussed elsewhere herein.

Referring now to FIG. 7, a flowchart illustrating a general process flow 700 for providing an interactive conference system is provided, in accordance with embodiments of the present invention. In Block 710, the system determines a ranking of at least two representatives based at least in part on feedback received from the user. In Block 720, the system initiates presentation of the at least two representatives in an order corresponding to the ranking and/or presentation of the ranking itself. As discussed above, this ranking may be based on the user's input such as the user's search criteria such as the department selected, the level of experience, language preferred and/or the like or may be based on the user's information retrieved from the financial institution's records, such as the user's location, types of accounts with the financial institution, language preferred, or other stored preferences that may have been previously input by the customer.

Referring now to FIG. 8, a flowchart illustrating a general process flow 800 for providing an interactive conference system is provided, in accordance with embodiments of the present invention. In Block 810, the system, in response to receiving user input selecting one of the representatives for connection, determines that the selected representative is unavailable for conference connection. In other embodiments, in response to receiving user input selecting one of the representatives for connection, the system establishes a connection with the representative and determines that another representative is needed, as represented by Block 820.

After Block 810 or Block 820, in Block 830 the system determines a second one of the representatives for conferencing with the user based on the representative having at least one characteristic indicated by the user's preferences, based on a recommendation from the selected representative, and/or based on the user having previously conferenced with the second representative. For example, in a case where the user's selected representative is unavailable for conferencing, the selected representative may recommend another representative to speak with the user. In some instances, the representative provides a recommended representative for particular topics of discussion, and in other instances, the representative provides a recommendation for another representative specific to the user. In some cases, when the user selects the representative from the pool of representatives and the selected representative is unavailable for conference, the system prompts the selected representative for a recommendation. In instances where the user has provided some input regarding the intended topic of conversation, this information may be forwarded to the selected representative so that the selected representative may provide a recommendation for one or more other representatives to the user.

In Block 840, the system establishes an operative connection with the second representative system associated with the second representative. In embodiments where it is determined a second representative is needed (Block 820), the system may establish a connection among the user, a first representative and the second representative. In other instances, a connection may be established between the user and the second representative and the first representative is disconnected, either simultaneous to the connection being established with the second representative or after sharing the connection with the user and the second representative for a period of time. In some instances, the connection with the first representative is disconnected and then a new connection is established with the second representative after the connection with the first representative has ended.

Referring now to FIG. 9, a screenshot of a user device 912 interface 900 presenting an opportunity for a user to select a representative from a pool of representatives is shown. The representatives 910 shown on the interface may be determined by the system in a variety of ways as described herein.

Referring now to FIG. 10, a screenshot of a user device interface 1000 presents a user with the opportunity to select a representative from a pool 1010 of representatives. The user is provided an opportunity to provide input indicating a desire for additional representatives from which to select. For example, the interface may allow the user to "swipe" the screen to scroll through one or more additional pages of representatives available for selection, as represented by arrow 1020. Once the user has chosen one of the representatives from the pool, in some embodiments, the interface may present the chosen representative in a prominent fashion, such as in the middle of the pool of representatives, as shown by arrow 1030. The interface may present the associate's image 1040, either still image, moving image, and/or live moving image of the representative. In some embodiments, the representative's title, specialty, education, experience, personal interests, personal statement 1050 and/or the like may be presented. The user may also place a direct call to the representative, such as an audio-visual conference, as represented by button 1060.

In various embodiments, the pool of representatives that is presented to the user is based, at least in part, on the user's profile stored in the financial institution system(s). The pool may also be based on what products the user currently has with the financial institution and what products or class of products they do not have with the financial institution. For example, the broad pool of available representatives may be filtered based on those representatives that are specialists in mortgages and demand deposit accounts (DDAs) if the system retrieves the user's profile and determines that the user has a mortgage and a DDA with the financial institution and knows, from user input, that the user is calling with questions about currently owned products.

In some embodiments, the ranking of the pool of representatives may be ranked based, at least in part, on user feedback or input. For example, the user may provide feedback after speaking with a representative and based on that feedback, in addition to feedback received from the user regarding other representatives, the pool of representative, such as a pool of previously-spoken with representatives, may be ranked and, in some cases, presented based on the user input-based rankings. In some embodiments, the user is provided an option for removing a particular representative from the pool of available representatives for future interactions. For example, if the customer does not enjoy the call with a particular representative the customer may select to remove the representative from future calls.

In some embodiments, the system may provide a record, such as an e-receipt or otherwise, to a representative prior to the representative entering the call with the customer so that the representative may recall a previous discussion between the representative and the customer.

In some embodiments, social media information such as information from one or more social personal and/or professional networks may be integrated into the system such that a customer can select a representative within a predetermined number of network connections of the customer. For example, the customer may be able to provide input to the system for a preference of an agent within n or fewer network connections of the customer, where n represents the customer's desired number of network connections.

In some embodiments, a customer's feedback data may be aggregated across customer inputs to provide ratings for agents with regard to how they solve particular categories of problems or advisory needs. For example, Representative One may receive a five (5) star rating for debit card and checking questions and Representative Two may receive a five (5) star rating for problems with online and bill payments. These ratings may be on a scale of one (1) to five (5) stars and be based on an aggregation of feedback from all customers (or some subset of customers) with whom the representatives have interacted. This rating may be used to filter the pool of representatives available to the customer for selection based on the customer's category of question or other input to the system. The ratings may also be presented to the customer for consideration in selecting a representative.

In some embodiments, locality may be incorporated into the selection of the pool of representatives presented to the customer for selection. For example, local representatives may be included in the pool of available representatives for the customer to consider. In one specific example, available representatives from the customer's local branch network may be included in the pool of representatives for the customer to consider for selection.

In some embodiments, representatives who have helped a customer's friends, family or other social network connection may be presented for consideration for selection. In some embodiments, only those representatives who have received a rating surpassing a predetermined threshold are presented to the customer for consideration, and in some embodiments the social network connection is specifically asked whether they would recommend the representative with whom they have spoken to other customers within their social network. In some embodiments, as the customer is considering a pool of available representatives for selection, the system presents to the customer information related to comments and/or feedback corresponding to the representative(s) in the pool that was input from one or more members of the customer's social network, such as friends and/or family.

In summary, embodiments of the invention are directed to systems, methods and computer program products for assisting a user to select a customer service representative of a financial institution in preparation for a customer service conference. Embodiments determine that an operative connection is being established between a user device of the user and a system associated with the financial institution, such that the user and the representative of the financial institution may conduct the conference; recognize the user as a customer enrolled in a representative pre-selection program; determine at least one representative from a pool of potential representatives, the at least one representative determined for presentation to the user for user selection and determined based at least in part on the user having previously conferenced with the at least one representative; and receive user input selecting one of the at least one representatives for conference connection.

This application incorporates by reference in their entirety each of the following applications filed concurrently herewith:

U.S. application Ser. No. 13/651,966, entitled SYSTEM PROVIDING AN INTERACTIVE CONFERENCE filed Oct. 15, 2012 to Matt Calman et al.;

U.S. application Ser. No. 13/652,120, entitled PROVIDING A RECORD OF AN INTERACTIVE CONFERENCE, filed Oct. 15, 2012 to Matt Calman et al.;

U.S. application Ser. No. 13/651,798, entitled ADAPTIVE SCAFFOLDING OF LEVELS OF CONNECTIVITY DURING A CONFERENCE, filed Oct. 15, 2012 to Matt Calman et al.;

U.S. application Ser. No. 13/651,674, entitled FUNCTIONALITY DURING A HOLD PERIOD PRIOR TO A CUSTOMER SERVICE VIDEO CONFERENCE filed Oct. 15, 2012 to Matt Calman et al.;

U.S. application Ser. No. 13/651,970, entitled SPLIT-SCREEN PRESENTATION OF FUNCTIONALITY DURING A HOLD PERIOD PRIOR TO A CUSTOMER SERVICE VIDEO CONFERENCE, filed Oct. 15, 2012 to Matt Calman et al.;

U.S. application Ser. No. 13/652,326, entitled MULTIPLE-PARTICIPANT CUSTOMER SERVICE CONFERENCE, filed Oct. 15, 2012 to Matt Calman et al.; and U.S. application Ser. No. 13/652,093, entitled REPRESENTATIVE SELECTION FOR CUSTOMER SERVICE CONFERENCE, filed Oct. 15, 2012 to Matt Calman et al.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for assisting a user to select a customer service representative of a financial institution in preparation for a customer service conference, the apparatus comprising:
    a memory;
    a processor; and
    a computing module stored in the memory, executable by the processor, and to cause the processor to:
        determine that an operative connection is being established between a user device of the user and a system associated with the financial institution, such that the user and the representative of the financial institution may conduct the conference;
        recognize the user as a customer enrolled in a representative pre-selection program;
        determine at least one representative from a pool of potential representatives, the at least one representative determined for presentation to the user for user selection and determined based at least in part on the user having previously conferenced with the at least one representative; and
        receive user input selecting one of the at least one representatives for conference connection.

2. The apparatus of claim 1, wherein the pool of potential representatives comprise at least one representative assigned to the user, the at least one representative assigned to the user being a loan officer, financial planner, or personal banker.

3. The apparatus of claim 1, wherein the computing module is further to cause the processor to:
    determine at least two representatives from a pool of potential representatives, wherein the user has previously conferenced with each of the at least two representatives;
    determine a ranking of the at least two representatives based at least in part on feedback received from the user; and
    initiate presentation of the at least two representatives in an order corresponding to the ranking or presentation of the ranking.

4. The apparatus of claim 1, wherein the computing module is further to cause the processor to:
    initiate presentation of the at least one representative to the user for user selection, the presentation comprising:
        initiating presentation of an image of the at least one representative; and initiating presentation of information associated with the at least one representative, the information comprising the representative's name, at least one personal interest of the representative, education information, and experience information.

5. The apparatus of claim 1, wherein the computing module is further to cause the processor to:
in response to receiving the user input selecting one of the representatives for connection, determine that the selected one of the representatives is unavailable for conference connection;
determine a second one of the representatives for conferencing with the user based at least in part on a recommendation from the selected one of the representatives; and
establishing an operative connection between the user device and a representative system associated with the second representative over which the user and the second representative can conduct an audio-visual conference.

6. The apparatus of claim 1, wherein the computing module is further to cause the processor to:
receive user preference information indicating the user's preference for at least one characteristic associated with a desired representative;
in response to receiving the user input selecting one of the representatives for connection, determine that the selected one of the representatives is unavailable for conference connection;
determine a second one of the representatives for conferencing with the user based at least in part on the at least one characteristic being associated with the second one of the representatives; and
establish an operative connection between the user device and a representative system associated with the second representative over which the user and the second representative can conduct an audio-visual conference.

7. The apparatus of claim 1, wherein the computer program code is further to cause the processor to:
in response to receiving the user input selecting one of the representatives for connection, establishing an operative connection between the user device and a representative system associated with the representative over which the user and the representative can conduct an audio-visual conference;
determine that a second representative is needed for the conference;
determine at least one second representative from a second pool of potential representatives, the at least one second representative determined for presentation to the user for user selection and determined based at least in part on the user having previously conferenced with the at least one second representative;
receive user input selecting one of the at least one second representatives for conference connection; and
establish an operative connection among the user device, a representative system associated with the representative, and a second representative system associated with the second representative over which the user, the representative and the second representative can conduct an audio-visual conference.

8. A method for assisting a user to select a customer service representative of a financial institution in preparation for a customer service conference, the method comprising:
providing a processor for executing computer program code stored in a non-transitory computer-readable medium to cause the processor to:
determine that an operative connection is being established between a user device of the user and a system associated with the financial institution, such that the user and the representative of the financial institution may conduct the conference;
recognize the user as a customer enrolled in a representative pre-selection program;
determine at least one representative from a pool of potential representatives, the at least one representative determined for presentation to the user for user selection and determined based at least in part on the user having previously conferenced with the at least one representative; and
receive user input selecting one of the at least one representatives for conference connection.

9. The method of claim 8, wherein the pool of potential representatives comprise at least one representative assigned to the user, the at least one representative assigned to the user being a loan officer, financial planner, or personal banker.

10. The method of claim 8, wherein the computing module is further to cause the processor to:
determine at least two representatives from a pool of potential representatives, wherein the user has previously conferenced with each of the at least two representatives;
determine a ranking of the at least two representatives based at least in part on feedback received from the user; and
initiate presentation of the at least two representatives in an order corresponding to the ranking or presentation of the ranking.

11. The method of claim 8, wherein the computing module is further to cause the processor to:
initiate presentation of the at least one representative to the user for user selection, the presentation comprising:
initiating presentation of an image of the at least one representative; and
initiating presentation of information associated with the at least one representative, the information comprising the representative's name, at least one personal interest of the representative, education information, and experience information.

12. The method of claim 8, wherein the computing module is further to cause the processor to:
in response to receiving the user input selecting one of the representatives for connection, determine that the selected one of the representatives is unavailable for conference connection;
determine a second one of the representatives for conferencing with the user based at least in part on a recommendation from the selected one of the representatives; and
establishing an operative connection between the user device and a representative system associated with the second representative over which the user and the second representative can conduct an audio-visual conference.

13. The method of claim 8, wherein the computing module is further to cause the processor to:
receive user preference information indicating the user's preference for at least one characteristic associated with a desired representative;
in response to receiving the user input selecting one of the representatives for connection, determine that the selected one of the representatives is unavailable for conference connection;

determine a second one of the representatives for conferencing with the user based at least in part on the at least one characteristic being associated with the second one of the representatives; and
establish an operative connection between the user device and a representative system associated with the second representative over which the user and the second representative can conduct an audio-visual conference.

14. The method of claim 8, wherein the computer program code is further to cause the processor to:
in response to receiving the user input selecting one of the representatives for connection, establishing an operative connection between the user device and a representative system associated with the representative over which the user and the representative can conduct an audio-visual conference;
determine that a second representative is needed for the conference;
determine at least one second representative from a second pool of potential representatives, the at least one second representative determined for presentation to the user for user selection and determined based at least in part on the user having previously conferenced with the at least one second representative;
receive user input selecting one of the at least one second representatives for conference connection; and
establish an operative connection among the user device, a representative system associated with the representative, and a second representative system associated with the second representative over which the user, the representative and the second representative can conduct an audio-visual conference.

15. A computer program product for assisting a user to select a customer service representative of a financial institution in preparation for a customer service conference the computer program product comprising:
a non-transitory computer-readable medium comprising a set of codes for causing a computer to:
determine that an operative connection is being established between a user device of the user and a system associated with the financial institution, such that the user and the representative of the financial institution may conduct the conference;
recognize the user as a customer enrolled in a representative pre-selection program;
determine at least one representative from a pool of potential representatives, the at least one representative determined for presentation to the user for user selection and determined based at least in part on the user having previously conferenced with the at least one representative; and
receive user input selecting one of the at least one representatives for conference connection.

16. The computer program product of claim 15, wherein the pool of potential representatives comprise at least one representative assigned to the user, the at least one representative assigned to the user being a loan officer, financial planner, or personal banker.

17. The computer program product of claim 15, wherein the computing module is further to cause the processor to:
determine at least two representatives from a pool of potential representatives, wherein the user has previously conferenced with each of the at least two representatives;
determine a ranking of the at least two representatives based at least in part on feedback received from the user; and
initiate presentation of the at least two representatives in an order corresponding to the ranking or presentation of the ranking.

18. The computer program product of claim 15, wherein the computing module is further to cause the processor to:
initiate presentation of the at least one representative to the user for user selection, the presentation comprising:
initiating presentation of an image of the at least one representative; and
initiating presentation of information associated with the at least one representative, the information comprising the representative's name, at least one personal interest of the representative, education information, and experience information.

19. The computer program product of claim 15, wherein the computing module is further to cause the processor to:
in response to receiving the user input selecting one of the representatives for connection, determine that the selected one of the representatives is unavailable for conference connection;
determine a second one of the representatives for conferencing with the user based at least in part on a recommendation from the selected one of the representatives; and
establish an operative connection between the user device and a representative system associated with the second representative over which the user and the second representative can conduct an audio-visual conference.

20. The computer program product of claim 15, wherein the computing module is further to cause the processor to:
receive user preference information indicating the user's preference for at least one characteristic associated with a desired representative;
in response to receiving the user input selecting one of the representatives for connection, determine that the selected one of the representatives is unavailable for conference connection;
determine a second one of the representatives for conferencing with the user based at least in part on the at least one characteristic being associated with the second one of the representatives; and
establish an operative connection between the user device and a representative system associated with the second representative over which the user and the second representative can conduct an audio-visual conference.

21. The computer program product of claim 15, wherein the computer program code is further to cause the processor to:
in response to receiving the user input selecting one of the representatives for connection, establishing an operative connection between the user device and a representative system associated with the representative over which the user and the representative can conduct an audio-visual conference;
determine that a second representative is needed for the conference;
determine at least one second representative from a second pool of potential representatives, the at least one second representative determined for presentation to the user for user selection and determined based at least in part on the user having previously conferenced with the at least one second representative;
receive user input selecting one of the at least one second representatives for conference connection; and
establish an operative connection among the user device, a representative system associated with the representative, and a second representative system associated with the second representative over which the user, the representative and the second representative can conduct an audio-visual conference.

\* \* \* \* \*